US009825688B2

(12) United States Patent
Chen et al.

(10) Patent No.: US 9,825,688 B2
(45) Date of Patent: Nov. 21, 2017

(54) SYSTEMS AND METHODS OF ANTENNA DIVERSITY SWITCHING

(71) Applicant: BOSE CORPORATION, Framingham, MA (US)

(72) Inventors: Louis Gwo-Chung Chen, Bolton, MA (US); Naganagouda Patil, Ashland, MA (US)

(73) Assignee: BOSE CORPORATION, Framingham, MA (US)

( * ) Notice: Subject to any disclaimer, the term of this patent is extended or adjusted under 35 U.S.C. 154(b) by 149 days.

(21) Appl. No.: 14/633,716

(22) Filed: Feb. 27, 2015

(65) Prior Publication Data
US 2016/0254850 A1 Sep. 1, 2016

(51) Int. Cl.
H04W 4/00 (2009.01)
H04B 7/08 (2006.01)
H04R 1/10 (2006.01)
H01Q 3/24 (2006.01)
H01Q 21/28 (2006.01)
H01Q 1/27 (2006.01)

(52) U.S. Cl.
CPC ............ *H04B 7/0814* (2013.01); *H01Q 3/24* (2013.01); *H01Q 21/28* (2013.01); *H04B 7/0834* (2013.01); *H04R 1/1041* (2013.01); *H04W 4/008* (2013.01); *H01Q 1/273* (2013.01); *H04R 2420/01* (2013.01); *H04R 2420/07* (2013.01)

(58) Field of Classification Search
CPC .... H04B 1/3838; H04B 7/082; H04B 7/0814; H04B 7/0817; H04B 7/0822; H04B 7/0825; H04B 17/318; H04B 7/0834; H04B 7/0837; H01Q 21/28; H01Q 3/24; H04W 4/008

USPC .... 370/329, 334; 455/67.11, 83, 134, 452.2, 455/575.2
See application file for complete search history.

(56) References Cited

U.S. PATENT DOCUMENTS

| 6,067,449 A * | 5/2000 | Jager ................... H04B 7/0814 455/134 |
| 2005/0185707 A1 | 8/2005 | Hoo et al. |
| 2007/0060195 A1* | 3/2007 | Hsiang ................. H04M 19/04 455/550.1 |

(Continued)

FOREIGN PATENT DOCUMENTS

EP 0676870 A1 10/1995
JP 2003163529 A 6/2003
(Continued)

OTHER PUBLICATIONS

International Search Report and Written Opinion for corresponding PCT/US2016/019516 dated May 13, 2016.

*Primary Examiner* — Kwang B Yao
*Assistant Examiner* — Harun Chowdhury
(74) *Attorney, Agent, or Firm* — Lando & Anastasi, LLP

(57) ABSTRACT

An audio device capable of intelligently switching between multiple antennas is provided. The audio device receives a wireless signal by a default receiving antenna, determines signal quality metrics of the wireless signal received by various antennas, compares the signal quality metrics of the wireless signal received by the various antennas, and selects a receiving antenna from the various antennas to receive the wireless signal based on the comparison of the signal quality metrics of the wireless signal received by the various antennas.

16 Claims, 5 Drawing Sheets

(56) References Cited

U.S. PATENT DOCUMENTS

| | | | | |
|---|---|---|---|---|
| 2007/0173200 A1* | 7/2007 | Estrada | ............... | H04B 17/318 455/67.11 |
| 2007/0173300 A1* | 7/2007 | Estrada | ............... | H04B 7/0837 455/575.2 |
| 2010/0297959 A1* | 11/2010 | Newton | ................ | H04B 7/082 455/83 |
| 2011/0134987 A1* | 6/2011 | Watanabe | ............ | H04B 7/0814 375/229 |
| 2012/0062422 A1* | 3/2012 | Wu | ...................... | H01Q 1/2258 342/374 |
| 2015/0358979 A1* | 12/2015 | Puranik | ................ | H04B 1/3838 455/452.2 |

FOREIGN PATENT DOCUMENTS

| | | |
|---|---|---|
| JP | 2006094386 A | 4/2006 |
| JP | 2008141588 A | 6/2008 |

\* cited by examiner

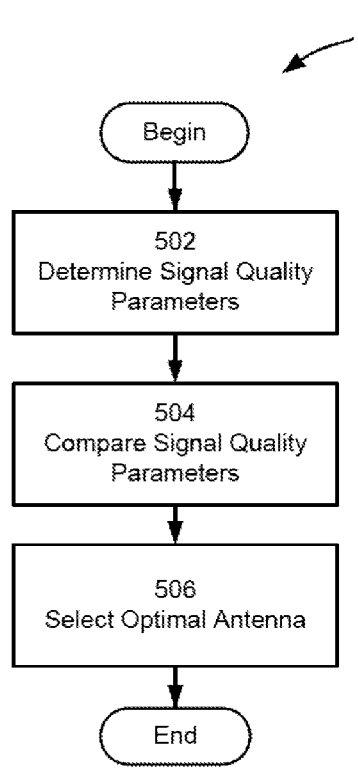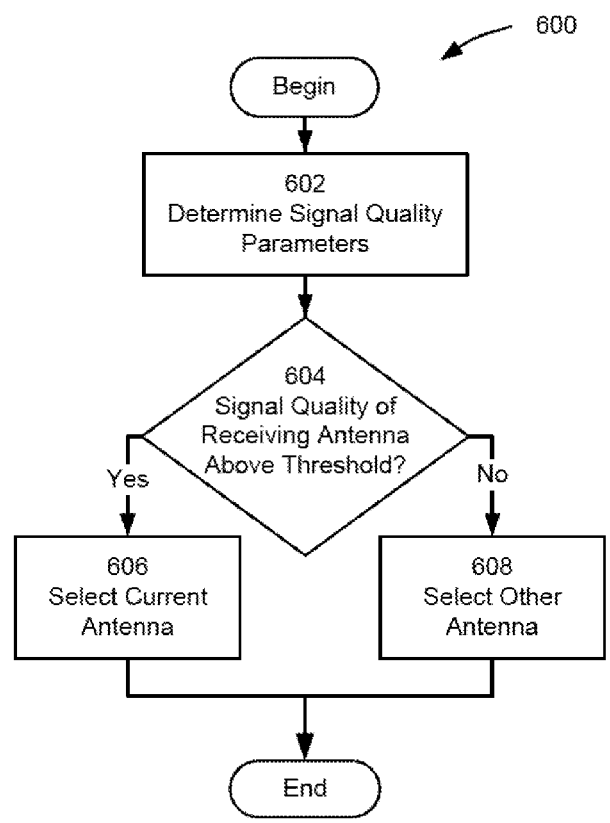
FIG. 5
FIG. 6

SYSTEMS AND METHODS OF ANTENNA DIVERSITY SWITCHING

TECHNICAL FIELD

The technical field relates generally to systems and methods of antenna diversity switching in audio devices.

BACKGROUND

Wireless audio devices typically receive audio information by a wireless signal via a single antenna. The strength of the wireless signal received by the audio device varies based on the obstructions between the antenna in the wireless audio device and the device transmitting the wireless signal. These obstructions may significantly attenuate the wireless signal received by the antenna and thereby introduce errors into the received audio information.

SUMMARY

According to at least one aspect, an audio device is provided. The audio device includes at least one speaker, a plurality of antennas to receive a wireless signal from a source, a controller coupled to the plurality of antennas and the at least one speaker, the controller including at least one processor coupled to a memory, and an antenna manager component executable by the at least one processor. The antenna manage may be configured to receive the wireless signal by a default receiving antenna where the default receiving antenna being one antenna of the plurality of antennas. The antenna manager may be further configured to determine one or more signal quality metrics of the wireless signal received by at least two antennas of the plurality of antennas over a period of time, compare the one or more signal quality metrics of the wireless signal received by each of the at least two antennas over the period of time, and select a receiving antenna from the at least two antennas to receive the wireless signal based on the comparison between the one or more signal quality metrics of the wireless signal received by each of the at least two antennas.

In one example, the one or more signal quality metrics include an average received signal strength. In this example, the antenna manager may be further configured to select the receiving antenna at least in part by selecting one antenna from the at least two antennas with a highest average received signal strength over the period of time.

In some examples, the one or more signal quality metrics include an average received signal strength and a standard deviation of received signal strength. In these examples, the antenna manager may be further configured to select the receiving antenna at least in part by selecting one antenna from the at least two antennas with a highest average received signal strength and a highest standard deviation of received signal strength over the period of time.

In one example, the antenna manager is further configured to monitor a duration of time each antenna of the at least two antennas is selected to receive the wireless signal. In this example, the antenna manager may be further configured to set the default receiving antenna to one antenna from the at least two antennas with a longest duration of time selected to receive the wireless signal.

In some examples, the at least one speaker, at least one antenna, and the controller are disposed within a housing. In these examples, the housing may be one of an over-ear housing, an on-ear housing, or an in-ear housing. The housing may be a headphone housing constructed to be worn about a head of a subject having a first side including a first antenna of the at least two antennas and a second side including a second antenna of the at least two antennas.

In some examples, the antenna manager is further configured to determine whether the source is on a left side of the subject or a right side of the subject based on the comparison between the one or more signal quality metrics of the wireless signal received by the at least two antennas. In these examples, the antenna manager may be further configured to select the receiving antenna at least in part by selecting the first antenna responsive to determining that the source is on the left side of the subject or selecting the second antenna responsive to determining that the source is on the right side of the subject.

In one example, the wireless signal includes audio information encoded in a BLUETOOTH wireless communication protocol. In this example, the audio device may further include an audio manager component executable by the at least one processor and configured to receive the audio information, generate an audio signal based on the audio information, and provide the audio signal to the at least one speaker.

In one example, the audio device further includes communication circuitry coupled between the controller and the at least two antennas. In this example, the communication circuitry may include a receiver or a switch.

According to at least one aspect, a method of antenna switching in an audio device is provided. The method may include receiving a wireless signal from a source device by a default receiving antenna from a plurality of antennas, determining one or more signal quality metrics of the wireless signal received by at least two antennas of the plurality of antennas over a period of time, comparing the one or more signal quality metrics of the wireless signal received by each of the at least two antennas, and selecting a receiving antenna from the at least two antennas to receive the wireless signal based on the comparison between the one or more signal quality metrics of the wireless signal received by each of the at least two antennas.

In some examples, the act of determining the one or more signal quality metrics includes determining an average received signal strength. In these examples, the act of selecting the receiving antenna may include selecting one antenna from the at least two antennas with a highest average received signal strength over the period of time.

In one example, the act of determining the one or more signal quality metrics includes determining an average received signal strength and a standard deviation of received signal strength. In this example, the act of selecting the receiving antenna may include selecting one antenna from the at least two antennas with a highest average received signal strength and a highest standard deviation of received signal strength over the period of time.

In one example, the act of comparing the one or more signal quality metrics includes comparing the one or more signal quality metrics of the wireless signal received by the default receiving antenna to a threshold. In this example, the act of selecting the receiving antenna may include selecting the default receiving antenna responsive to the one or more signal quality metrics of the wireless signal received by the default receiving antenna exceeding the threshold. The method may also further include adjusting the threshold based on the one or more signal quality metrics of the wireless signal received by each of the at least two antennas over the period of time.

In one example, the method further includes determining whether the source device is on the left side of a subject or the right side of the subject based on the comparison between the one or more signal quality metrics of the wireless signal received by each of the at least two antennas over the period of time. In another example, the method further includes monitoring a duration of time each antenna of the at least two antennas is selected to receive the wireless signal and setting the default receiving antenna to one antenna from that at least two antennas with a longest duration of time selected to receive the wireless signal.

In one example, the act of receiving the wireless signal includes receiving audio information encoded in a BLU-ETOOTH wireless communication protocol. In this example, the method may further include generating an audio signal based on the audio information and playing the audio signal by a sound transducer of the audio device.

According to at least one aspect, an antenna switching is provided. The antenna switching system may include a plurality of antennas to receive a wireless signal from a source, a plurality of controllers connected in a network where each controller is coupled to at least one antenna of the plurality of antennas and includes at least one processor coupled to a memory, and an antenna manager component, executable by the at least one processor of at least one controller of the plurality of controllers. The antenna manager component may be configured to receive the wireless signal by a default receiving antenna where the default receiving antenna is one antenna of the plurality of antennas, determine one or more signal quality metrics of the wireless signal received by at least two antennas of the plurality of antennas over a period of time, compare the one or more signal quality metrics of the wireless signal received by each of the at least two antennas, and select a receiving antenna from the at least two antennas to receive the wireless signal based on the comparison between the one or more signal quality metrics of the wireless signal received by each of the at least two antennas.

Still other aspects, examples, and advantages of these exemplary aspects are discussed in detail below. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 5 is a flow diagram illustrating another example antenna selection process; and FIG. 6 is a flow diagram illustrating another example antenna selection process.

DETAILED DESCRIPTION

The following examples describe systems and methods of antenna diversity switching in audio devices to improve the quality of the received wireless signal. For instance, some examples disclosed herein manifest an appreciation that a wireless signal transmitted from an electronic device in a pocket of a subject to an audio device worn by the subject is likely blocked by the subject's torso thereby creating a shadowing effect on the wireless signal, which may be represented by a probability distribution function. In this environment, the received signal strength is statistically stronger when the antenna is positioned on the same side of the subject as the electronic device. Accordingly, some examples include audio devices with multiple antennas in different locations within the audio device that monitor various signal quality characteristics of the received signal to select an optimal antenna. For example, the audio device may select an antenna on the same side of the subject as the audio device.

The examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Audio Device

Figure 1A:
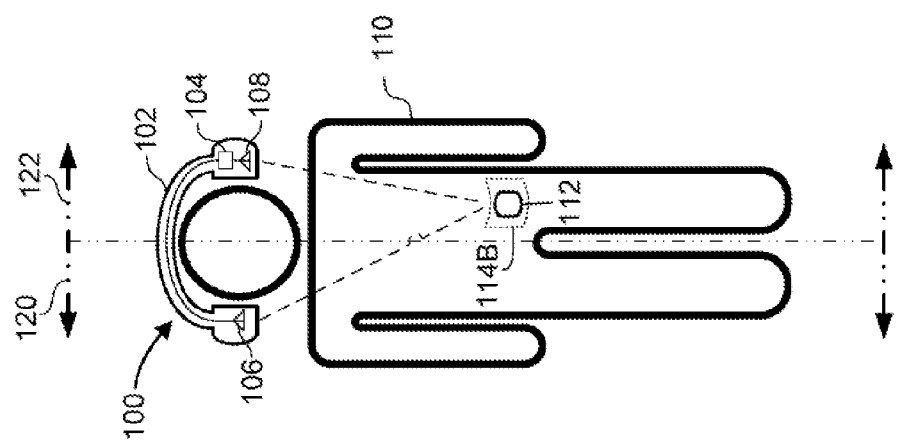
FIGS. 1A and 1B are illustrations of an example audio device in communication with a source device.
Figure 1B:
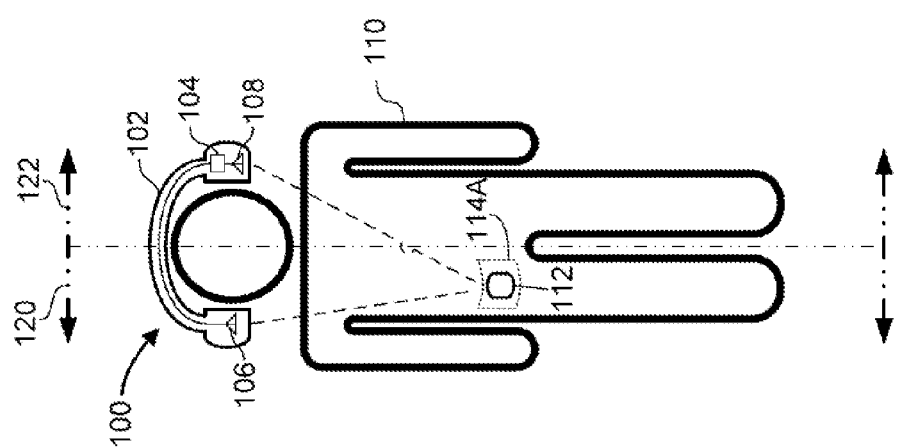

Various examples disclosed herein implement antenna switching systems in audio devices. FIGS. 1A and 1B illustrate an example audio device 100 worn by a subject 110 in wireless communication with a source device 112. As shown in FIGS. 1A and 1B, the audio device 100 includes a housing 102, a controller 104, a first antenna 106, and a second antenna 108. In FIG. 1A, the audio device 100 is in wireless communication with the source device 112 in pocket 114A on a left side 120 of the subject 110. While in FIG. 1B, the audio device 100 is in wireless communication with the source device 112 in pocket 114B on a right side 122 of the subject 110.

As illustrated in FIGS. 1A and 1B, the first antenna 106 is disposed on the left side 120 of the audio device 100 and the second antenna 108 is disposed on the right side 122 of the audio device 100. In the illustrated antenna configuration, the audio device controller 104 may select one antenna from the first and second antennas 106 and 108, respectively. For example, the audio device 100 may select antenna 106 in FIG. 1A and select antenna 108 in FIG. 1B. Selecting an antenna on the same side of the subject as the source device is advantageous because the received signal quality is likely to be better at the antenna on the same side. Table 1 below of Received Signal Strength Indicator (RSSI) values in decibels (db) illustrates the signal strength at an antenna on the same side of the subject relative to the signal strength at an antenna on the opposite side of the subject.

TABLE 1

|  | Same Side of Subject | | Opposite Side of Subject | |
| --- | --- | --- | --- | --- |
|  | Front Pocket | Rear Pocket | Front Pocket | Rear Pocket |
| Average (Mean) | −63.91 db | −67.17 db | −76.28 db | −74.96 db |
| Standard Deviation | 5.56 db | 4.25 db | 4.17 db | 1.68 db |

As illustrated by Table 1, the average received signal strength at an antenna on the same side of the subject is at least 7 decibels stronger relative to the received signal strength of an antenna on the opposite side of the body regardless of whether the source device is in the front or rear pockets on a given side.

Figure 3:
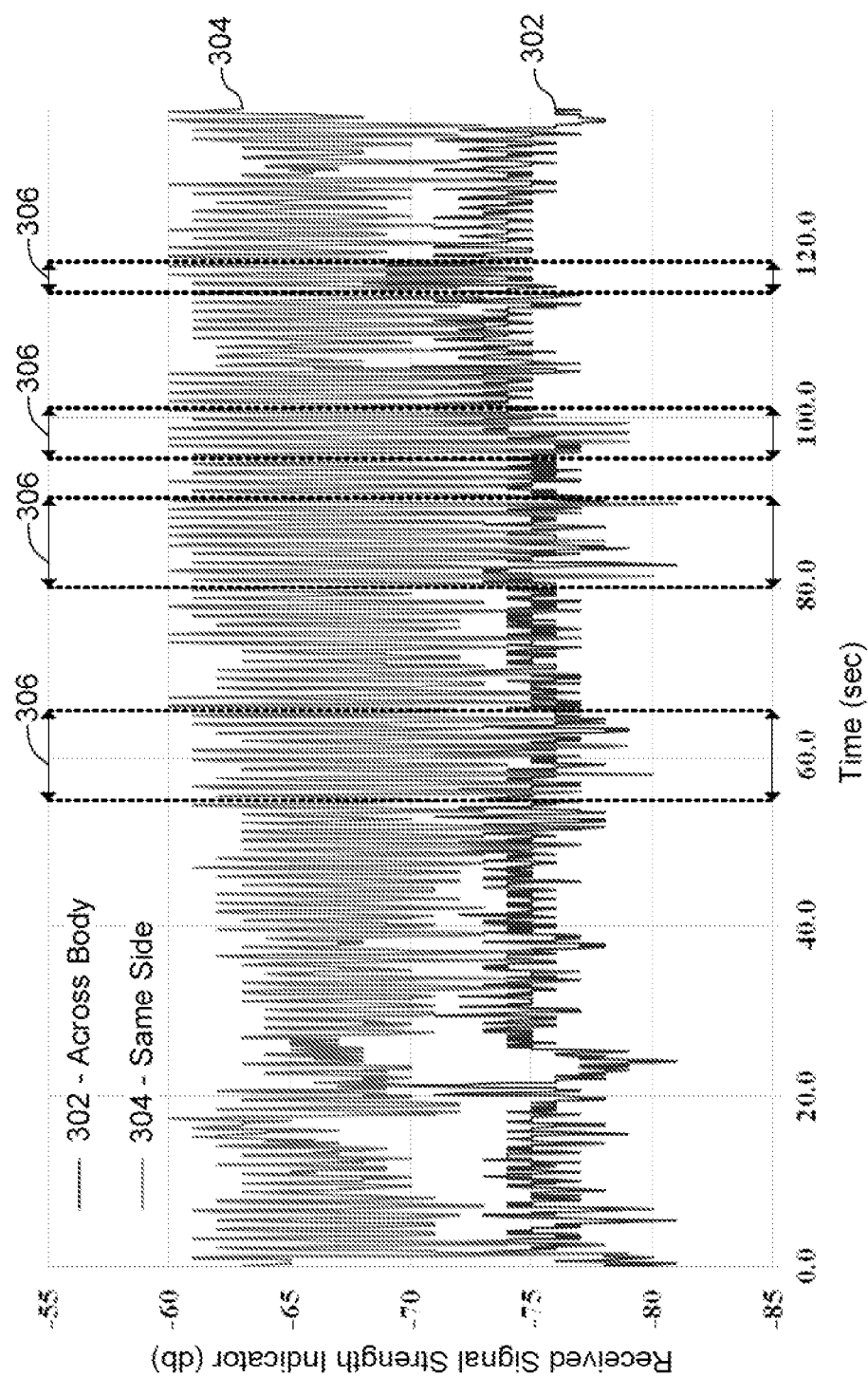
FIG. 3 is an example graph of received signal strength from two antennas in an example audio device.

In some examples, the audio device controller 104 analyzes various signal quality parameters to identify an optimal receiving antenna (e.g., an antenna on the same side as the source device). Example processes performed by the audio device controller 104 are described in more detail below with reference to the Example Antenna Selection Processes section and FIGS. 4-6. The particular parameters analyzed to select the optimal antenna may include, for example, an average received signal strength and/or a standard deviation of received signal strength. The average received signal strength may include the average RSSI over 10 seconds (e.g., 100 samples with a 0.1 second sampling period) or the average RSSI over 20 seconds (e.g., 200 samples with a 0.1 second sampling period). Analyzing the average received signal strength and/or the standard deviation of received signal strength may be advantageous relative to other methods because it yields better antenna selection results. FIG. 3 illustrates an example graph showing the RSSI in db of the wireless signal received by an antenna on the same side of the body 304 compared with an antenna on the opposite side of the body 302. The instantaneous RSSI of the antenna on the same side of the body 304 is not always above the instantaneous RSSI of the antenna on the opposite side of the body 302 as illustrated during time periods 306. Accordingly, employing an average received signal strength and/or a standard deviation of received signal strength yields more accurate results by avoiding switching out of a statistically favorable state in addition to reducing unproductive antenna switching relative to systems that employ only instantaneous received signal strength.

Referring back to FIGS. 1A and 1B, the audio device 100 is not limited to the particular implementation illustrated. For example, additional antennas may be added to the audio device 100 and coupled to the controller 104 to further improve the received wireless signal quality. In addition, the wireless antennas 106 and 108 do not need to be disposed in a left ear cup and a right ear cup, respectively, of the audio device 100. The wireless antennas 106 and 108 may be placed in the left and right sides, respectively, of the headband connecting the ear cups. Further, the location of the controller 104 may be adjusted based on the particular implementation of the audio device 100. For example, the controller 104 may be placed in the headband connecting the ear cups or in either ear cup. In other examples, the audio device 100 may employ multiple controllers 104 in communication with each other (e.g., by wireless or wired communication links). For example, the audio device may include a dedicated controller for each antenna and the dedicated controllers may work in a collaborative fashion to identify an appropriate antenna to receive a wireless signal.

It is appreciated that the audio device housing 102 is not limited to the particular implementation illustrated in FIGS. 1A and 1B. For example, the audio device housing 102 may be any one of an over-ear housing, an on-ear housing, and an in-ear housing. Further, the audio device 100 is not limited to head mounted audio devices (e.g., headphones and headsets) and may include, for example, wireless home audio systems or vehicle audio systems.

Figure 2:
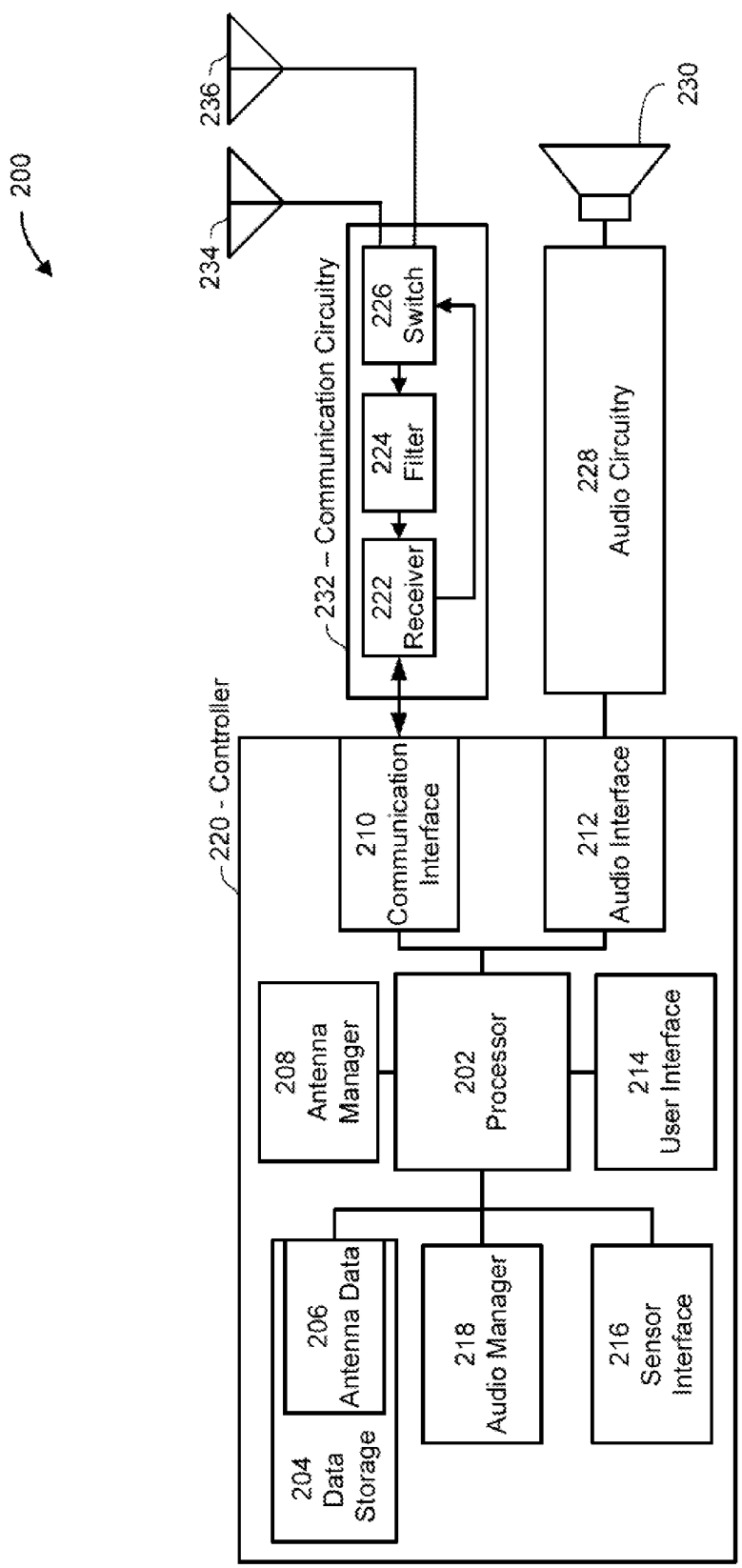
FIG. 2 is a functional schematic of one example audio device.

The audio device 100 may include additional components to facilitate the receipt and processing of the wireless signal as illustrated by the functional schematic of example audio device 200 in FIG. 2. The audio device 200 includes a controller 220, audio circuitry 228, a speaker 230, communication circuitry 232, a first antenna 234, and a second antenna 236. The controller 220 includes a processor 202, data storage 204 having antenna data 206, an antenna manager component 208, a communication interface 210, an audio interface 212, a user interface 214, a sensor interface 216, and an audio manager component 218. It is appreciated that the audio device 200 may further include a rechargeable battery (not illustrated) and/or a receptacle to hold one or more disposable batteries (not illustrated) that provide electrical power to the other various components.

As illustrated in FIG. 2, the processor 202 is coupled to the data storage 204 and various controller interfaces 210, 212, 214, and 216. The processor 202 performs a series of instructions that result in data which are stored in and retrieved from the data storage 204. The data storage 204 includes a computer readable and writeable nonvolatile data storage medium configured to store non-transitory instructions and data. The medium may, for example, be optical disk, magnetic disk or flash memory, among others, and may be permanently affixed to, or removable from, the audio device 200.

In some examples, the antenna manager component 208 is configured to select an optimal antenna to receive wireless signals from a source device. Example processes performed by the antenna manager component 208 are described in more detail below with reference to the Example Antenna Selection Processes section and FIGS. 4-6. The antenna manager component 208 may be implemented using hardware or a combination of hardware and software. For instance, in one example, the antenna manager component 208 is implemented as a software component that is stored within the data storage 204 and executed by the processor 202. In other examples, antenna manager component 208 may be an application-specific integrated circuit (ASIC) that is coupled to the processor 202. Thus, examples of the antenna manager component 208 are not limited to a particular hardware or software implementation.

In some examples, the antenna data 206 includes data used by the antenna manager component 208 to select an optimal antenna to receive wireless signals from a source device. As illustrated in FIG. 2, the antenna manager component 208 and the antenna data 206 are separate. However, in other examples, the antenna manager component 208 and the antenna data 206 may be combined into a single component or re-organized so that a portion of the data are included in the antenna manager 208. Such variations in these and the other components illustrated in FIG. 2 are intended to be within the scope of the examples disclosed herein.

In some examples, the audio manager component 218 receives audio information, for example via the communication interface 210, and generates an audio signal based on the received audio information. The audio signal may be provided to the speaker 230, for example via the audio interface 212. Similar to the antenna manager 208 described above, the audio device manager 218 may be implemented using software, hardware, or a combination of hardware and software.

As shown in FIG. 2, the audio device controller 220 includes several system interface components 210, 212, 214, and 216. Each of these system interface components is configured to exchange, e.g., send or receive, data with one or more specialized devices that may be located within the audio device 200 or elsewhere. These specialized devices may include, for example, buttons, switches, light emitting diodes (LED), microphones, speakers, and/or antennas. The components used by the interfaces 210, 212, 214, and 216 may include hardware components, software components or a combination of both.

In some examples, components of the sensor interface 216 couple the processor 202 to one or more sensors including, for example, ambient sound sensors. The ambient sound information received by the ambient sound sensors may be employed by the audio manager component 218 to adjust the audio signal provided to the speaker 230. For example, the audio manager component 218 may adjust a volume level of the audio signal in tandem with the ambient sound information to increase the audio signal volume as the ambient sound level increases and/or decrease the audio signal volume as the ambient sound level decreases. It is appreciated that the ambient sound information may be employed by the audio device controller 220 for other purposes. In some examples, the ambient sound information is employed to provide a noise canceled audio signal to the speaker to reduce the ambient noise heard by a listener as described in commonly owned U.S. Pat. No. 8,189,803, titled "NOISE REDUCTION HEADSET," issued on May 29, 2012, which is hereby incorporated herein by reference in its entirety.

In some examples, the components of the audio interface 212 couple one or more transducers including, for example, the speaker 230 to the processor 202. In some examples, the audio interface 212 provides an audio signal generated by, for example, the audio manager component 218, to the speaker 230 via audio circuitry 228. The audio circuitry 228 may include, for example, various amplifiers and filters to condition the audio signal provided by the audio interface 212. In some examples, the functionality of the audio circuitry 228 is incorporated into the audio interface 212 and the speaker 230 is directly coupled to the audio interface 212.

In some examples, the components of the communication interface 210 couple the processor 202 to other devices. For example, the communication interface 210 may enable communication between the processor 202 of the audio device controller 220 and, for example, a cellular phone, a portable media player, a computer-enabled watch, and/or a personal computer. The communication interface 210 may support any of a variety of standard and protocols including, for example, BLUETOOTH and/or IEEE 802.11. The audio device controller 220 may perform one or more pairing processes to, for example, initially establish a communication link as described in commonly-owned U.S. Patent Publication No. 2014/0256260, titled "WIRELESS DEVICE PAIRING," filed on Mar. 7, 2013, which is hereby incorporated herein by reference in its entirety.

As illustrated in FIG. 2, the communication interface 210 is coupled to antennas 234 and 236 by communication circuitry 232. The communication circuitry 232 includes, for example, various filters, amplifiers, receivers, transmitters, and/or transceivers. It is appreciated that any portion of the communication circuitry 232 may be included within the communication interface 210 and that in some examples the antennas 234 and 236 are directly coupled to the communication interface 210.

In one example, the communication circuitry 238 includes a receiver 222 coupled to a switch 226 by a filter 224. The switch 226 connects one of the first antenna 234 and the second antenna 236 to the filter 224 and subsequently the receiver 222. The switch 226 may be a single pole double throw switch (SPDT). It is appreciated that different communication circuitry implementations may be employed based on the number of antennas coupled to the communication interface 210. In addition, the receiver 222 may be a transceiver configured to both process signals received by an antenna and provide signals to the antenna for wireless transmission.

In some examples, the receiver 222 generates the control signal to control the state of the switch 226. For example, the receiver 222 may receive an instruction generated by the antenna manager component 208 to switch the receiving antenna from the first antenna 234 to the second antenna 236. The receiver 222 may direct the switch 226 to change state and connect the second antenna 236 to the filter 224. In another example, the receiver 222 may briefly change the state of the switch to sample a received signal strength of another antenna responsive to, for example, a request received from the antenna manager component 208. In this example, the receiving antenna may be the first antenna 234 and the receiver 222 may instruct the switch 226 to briefly change state to connect the second antenna 236 to the receiver 222. While the second antenna 236 is connected to the filter 224, the receiver can sample the received signal strength of the second antenna 236. After the receiver 222 samples the received signal strength of the second antenna 236, the receiver 222 may instruct the switch 226 to change back to the previous state.

The user interface 214 shown in FIG. 2 includes a combination of hardware and software components that allow the audio device 200 to communicate with an external entity, such as a user. These components may be configured to receive information from actions such as physical movement and/or verbal intonation. Examples of the components that may be employed within the user interface 214 include buttons, switches, light-emitting diodes, touch screens, displays, or an application on a computer-enabled device in communication with the audio device 200.

Thus, the various system interfaces allow the audio device controller 220 to interoperate with a wide variety of devices in various contexts. It is appreciated that various interfaces may be removed from the audio device controller 220 based on the particular construction and features of the audio device. For example, the sensor interface 216 may be removed in audio devices without any features using ambient sound information (e.g., some noise canceling feature implementations). In addition, particular components may be adjusted or added to suit the particular construction of audio device 200. For example, the audio device may include multiple speakers.

The audio device 200 has a variety of potential implementations. In at least some examples, the audio device 200 may be constructed in the form of a pair of headphones. The headphones may include, for example, over-ear headphones, on-ear headphones, or in-ear headphones. Other implementations may include, for example, vehicle audio systems, home theatre systems, and home stereo systems.

Example Antenna Selection Processes

Figure 4:
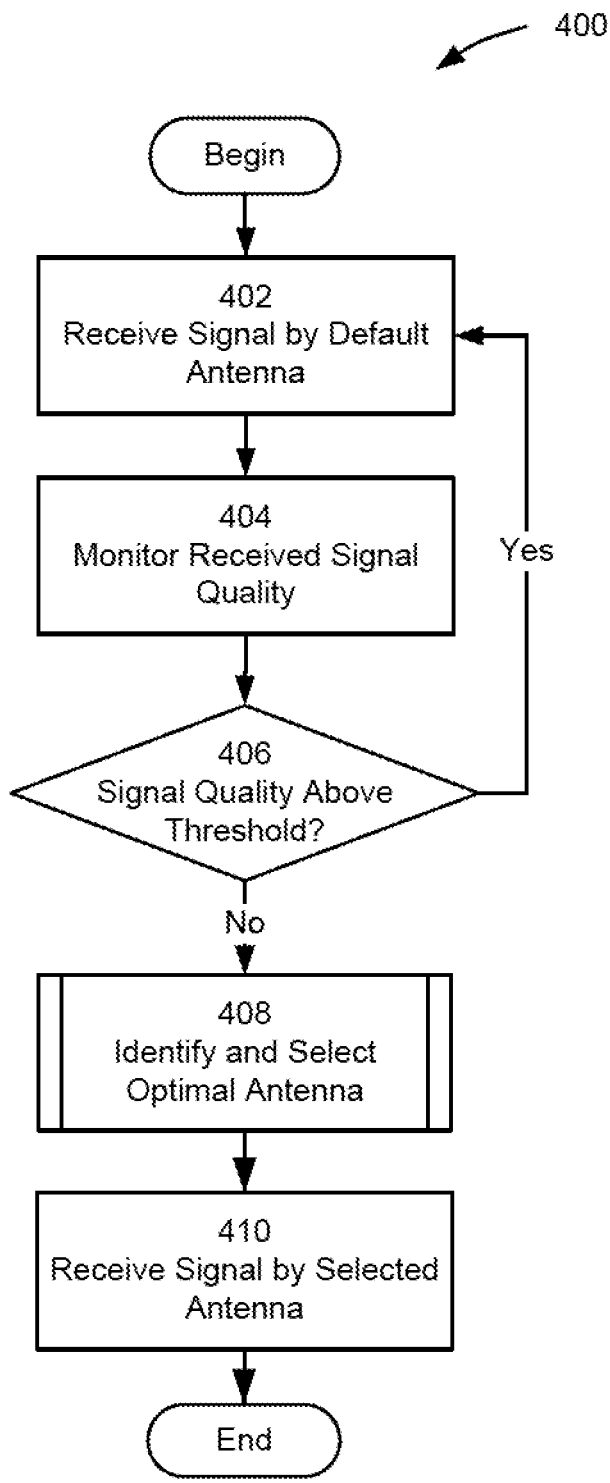
FIG. 4 is a flow diagram illustrating an example antenna selection process.

Various examples implement and enable processes through which an audio device may select an optimal antenna from a set of antennas to receive a wireless signal. FIG. 4 illustrates one such process including the acts of receiving a signal by a default receiving antenna 402, monitoring the received signal quality 404, determining whether the signal quality is above a threshold 406, identifying and selecting an optimal antenna 408, and receiving the signal by the selected receiving antenna 410.

In act 402, the audio device receives a wireless signal by a default receiving antenna. The default receiving antenna may be one antenna from the set of antennas in the audio device. In some examples, the audio device stores a value in memory indicating which antenna of the set of antennas is the default receiving antenna. In these examples, the audio device may employ the default receiving antenna to receive the wireless audio signal upon being turned on. The audio device may adjust the default receiving antenna as the audio device is used. For example, the audio device may track the amount of time each antenna of the set of antennas is selected as the receiving antenna and select the antenna that is most frequently used as the default receiving antenna.

In act 404, the audio device monitors the received signal quality. For example the audio device may monitor the received signal strength (e.g., RSSI) from the default receiving antenna. The audio device may monitor the received signal strength by periodically sending requests to a receiver requesting the current RSSI value.

In act 406, the audio device determines whether the signal quality of the default receiving antenna is above the threshold. The signal quality threshold may include, for example, a minimum instantaneous received signal strength, a minimum average received signal strength, and/or a maximum degradation rate of received signal strength. If the signal quality is above the threshold, the audio device returns to act 402 to receive the signal by the default receiving antenna. Otherwise, the audio device proceeds to act 408 to identify and select the optimal receiving antenna.

Employing acts 402, 404, and 406 may advantageously minimize the switching between various antennas. For example, the audio device may not switch or identify and select the optimal antenna in act 408 unless the signal strength from the default receiving antenna has degraded. Accordingly, the audio device would not switch from the default receiving antenna to another antenna in environments where the signal strength is very strong at the default receiving antenna.

In act 408, the audio device identifies and selects an optimal receiving antenna. Various processes performed by the audio device in act 408 are described further below with references to FIGS. 5 and 6.

In act 410, the audio device receives the wireless signal by the selected receiving antenna identified in act 408. It is appreciated that process 400 may be repeated to monitor the selected receiving antenna and switch antennas as appropriate. For example, process 400 may be repeated and the default receiving antenna in act 402 may be replaced with the current selected receiving antenna.

FIG. 5 illustrates an example process 500 to identify and select the optimal antenna from a set of antennas. Process 500 includes the acts of determining signal quality parameters 502, comparing signal quality parameters 504, and selecting the optimal antenna 506.

In act 502, the audio device determines various signal quality parameters. As described above, the signal quality parameters may include an average received signal strength and/or a standard deviation of the received signal strength. The various quality parameters may be determined for the default receiving antenna and at least one other antenna from the set. It is appreciated that the particular signal quality parameters determined may vary based off of the criteria employed to select the optimal antenna.

In act 504, the audio device compares the signal quality parameters of the default receiving antenna and the other antenna from the set. For example, the audio device may compare the average received signal strength of the default receiving antenna to the average received signal strength of the other antenna to determine which antenna has the highest average received signal strength. In another example, the audio device may compare both the average received signal strength and the standard deviation of received signal strength.

In act 506, the audio device selects the optimal antenna from the set of antennas. For example, the audio device may select the antenna with the highest average received signal strength. In another example, the audio device employs both average received signal strength and standard deviation of signal strength. In this example, the audio device may select the antenna with both the highest average received signal strength and the highest standard deviation of signal strength. As described above, the selected optimal antenna may be indicative of the antenna closest to the source device and/or on the same side of the subject as the source device.

FIG. 6 illustrates another example process to identify and select the optimal receiving antenna from a set of antennas. Process 600 includes the acts of determining signal quality parameters 602, determining whether the signal quality parameters of the current receiving antenna are above the threshold 604, selecting the current receiving antenna 606, and selecting another antenna 608.

In act 602 the audio device determines signal quality parameters. As described above with reference to act 502 in process 500, in particular signal parameters determined may vary based on the criteria employed to select the optimal antenna.

In act 604, the audio device determines whether the signal quality of the current receiving antenna is above the threshold. The threshold may be a minimum average received signal strength and/or a minimum standard deviation of received signal strength. The threshold may be determined based off of, for example, historical received signal strength data. In one example, the audio device identifies a particular set of characteristics of the received signal in a worst case scenario (e.g., the subject is outside and the source device is on the opposite side of selected antenna). In this example, the audio device may define the threshold equal to or a given margin above the set of characteristics associated with the worst case scenario. If the audio device determines that the signal quality of the current receiving antenna (e.g., the default receiving antenna) is above the threshold, the audio device continues to act 606 and selects the current receiving antenna. Otherwise, the audio device assumes that another antenna has better received signal quality and proceeds to act 608 to select a different antenna as the receiving antenna.

In some examples, the audio device may employ a lookup table in act 604 in place of or in combination with the threshold comparison. For example, the audio device may input various combinations of signal quality parameters of the current receiving antenna, or any number of other antennas from the set, into the lookup table and generate an optimal antenna selection. The lookup table may be generated based on historical received signal strength data. For example, the lookup table may be formed based on received signal characteristics of each antenna in the set under various conditions. In some implementations with more than two antennas, the lookup table may indicate a particular antenna as the optimal antenna based on the received signal quality parameters.

Each of the processes disclosed herein depicts one particular sequence of acts in a particular example. The acts included in each of these processes may be performed by, or using, an audio device specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely an audio device configured according to the examples disclosed herein.

Having thus described several aspects of at least one example of this disclosure, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. An audio device comprising:
   at least one speaker;
   a plurality of antennas to receive a wireless signal from a source;
   a controller coupled to the plurality of antennas and the at least one speaker, the controller including at least one processor coupled to a memory; and
   an antenna manager component executable by the at least one processor and configured to:
      receive the wireless signal by a default receiving antenna, the default receiving antenna being one antenna of the plurality of antennas;
      determine one or more signal quality metrics of the wireless signal received by each of at least two antennas of the plurality of antennas over a period of time, wherein the one or more signal quality metrics comprise an average received signal strength and a standard deviation of received signal strength;
      compare the one or more signal quality metrics of the wireless signal received by each of the at least two antennas over the period of time;
      select a receiving antenna from the at least two antennas to receive the wireless signal based on the comparison between the one or more signal quality metrics of the wireless signal received by each of the at least two antennas, wherein in selecting the receiving antenna the antenna manager is configured to select the receiving antenna at least in part by selecting one antenna from the at least two antennas with a highest average received signal strength and a highest standard deviation of received signal strength over the period of time; and
      receive the wireless signal by the selected receiving antenna.

2. The audio device of claim 1, wherein the antenna manager is further configured to monitor a duration of time each antenna of the at least two antennas is selected to receive the wireless signal and set the default receiving antenna to one antenna from the at least two antennas with a longest duration of time selected to receive the wireless signal.

3. The audio device of claim 1, wherein the at least one speaker, at least one antenna, and the controller are disposed within a housing.

4. The audio device of claim 3, wherein the housing is an over-ear housing, an on-ear housing, or an in-ear housing.

5. The audio device of claim 3, wherein the housing includes a headphone housing constructed to be worn about a head of a subject, the headphone housing having a first side including a first antenna of the at least two antennas and a second side including a second antenna of the at least two antennas.

6. The audio device of claim 5, wherein the antenna manager is further configured to determine whether the source is on a left side of the subject or a right side of the subject based on the comparison between the one or more signal quality metrics of the wireless signal received by the at least two antennas.

7. The audio device of claim 6, wherein the antenna manager is further configured to select the receiving antenna at least in part by selecting the first antenna responsive to determining that the source is on the left side of the subject or selecting the second antenna responsive to determining that the source is on the right side of the subject.

8. The audio device of claim 1, wherein the wireless signal includes audio information encoded in a BLUETOOTH wireless communication protocol and wherein the audio device further comprises an audio manager component executable by the at least one processor and configured to receive the audio information, generate an audio signal based on the audio information, and provide the audio signal to the at least one speaker.

9. The audio device of claim 1, further comprising communication circuitry coupled between the controller and the at least two antennas, the communication circuitry including a receiver or a switch.

10. A method of antenna switching in an audio device comprising:
   receiving a wireless signal from a source device by a default receiving antenna from a plurality of antennas;
   determining one or more signal quality metrics of the wireless signal received by each of at least two antennas of the plurality of antennas over a period of time, wherein the one or more signal quality metrics comprise an average received signal strength and a standard deviation of received signal strength;
   comparing the one or more signal quality metrics of the wireless signal received by each of the at least two antennas;
   selecting a receiving antenna from the at least two antennas to receive the wireless signal based on the comparison between the one or more signal quality metrics of the wireless signal received by each of the at least two antennas, wherein selecting the receiving antenna comprises selecting one antenna from the at least two antennas with a highest average received signal strength and a highest standard deviation of received signal strength over the period of time; and
   receiving the wireless signal by the selected receiving antenna.

11. The method of claim 10, wherein comparing the one or more signal quality metrics includes comparing the one or more signal quality metrics of the wireless signal received by the default receiving antenna to a threshold and wherein selecting the receiving antenna includes selecting the default receiving antenna responsive to the one or more signal quality metrics of the wireless signal received by the default receiving antenna exceeding the threshold.

12. The method of claim 11, further comprising adjusting the threshold based on the one or more signal quality metrics of the wireless signal received by each of the at least two antennas over the period of time.

13. The method of claim 10, further comprising determining whether the source device is on the left side of a subject or the right side of the subject based on the comparison between the one or more signal quality metrics of the wireless signal received by each of the at least two antennas over the period of time.

14. The method of claim 10, further comprising monitoring a duration of time each antenna of the at least two antennas is selected to receive the wireless signal and setting the default receiving antenna to one antenna from that at least two antennas with a longest duration of time selected to receive the wireless signal.

15. The method of claim 10, wherein receiving the wireless signal includes receiving audio information encoded in a BLUETOOTH wireless communication protocol and wherein the method further comprises generating an audio signal based on the audio information and playing the audio signal by a sound transducer of the audio device.

16. An antenna switching system comprising:
   a plurality of antennas to receive a wireless signal from a source;
   a plurality of controllers connected in a network, each controller of the plurality of controllers being coupled to at least one antenna of the plurality of antennas and including at least one processor coupled to a memory; and
   an antenna manager component, executable by the at least one processor of at least one controller of the plurality of controllers, configured to:
      receive the wireless signal by a default receiving antenna, the default receiving antenna being one antenna of the plurality of antennas;
      determine one or more signal quality metrics of the wireless signal received by each of at least two antennas of the plurality of antennas over a period of time, wherein the one or more signal quality metrics comprise an average received signal strength and a standard deviation of received signal strength;
      compare the one or more signal quality metrics of the wireless signal received by each of the at least two antennas;
      select a receiving antenna from the at least two antennas to receive the wireless signal based on the comparison between the one or more signal quality metrics of the wireless signal received by each of the at least two antennas, wherein in selecting the receiving antenna the antenna manager is configured to select the receiving antenna at least in part by selecting one antenna from the at least two antennas with a highest average received signal strength and a highest standard deviation of received signal strength over the period of time; and
      receive the wireless signal by the selected receiving antenna.

* * * * *